United States Patent

Lundgreen et al.

[15] 3,641,572
[45] Feb. 8, 1972

[54] DIGITAL ECHO PROTECTION CIRCUIT FOR DME AND TACAN

[72] Inventors: Michael W. Lundgreen, Cedar Rapids, Iowa; Rolin H. Denniston, Crystal, Minn.

[73] Assignee: Collins Radio Company, Cedar Rapids, Iowa

[22] Filed: Jan. 19, 1970

[21] Appl. No.: 3,699

[52] U.S. Cl. .................................................. 343/7.3
[51] Int. Cl. .................................. G01s 9/16, G01s 9/56
[58] Field of Search ........................................ 343/7.3

[56] References Cited

UNITED STATES PATENTS 3,478,355  11/1969  Lundgreen et al. .................. 343/7.3
3,539,978  11/1970  Stedtnitz .............................. 343/7.3

Primary Examiner—T. H. Tubbesing
Attorney—Warren H. Kintzinger and Robert J. Crawford

[57] ABSTRACT

A false distance indication sensing and correction circuit for aircraft radio distance measuring systems, such as DME, that searches from zero miles out to the DME range gate or 100 miles whichever is shorter. When the echo monitor range gate is coincident with a decoded video pulse, it looks again at the same range two more times and then continues on outbound if decoded video pulses do not reappear in the echo monitor range gate with the repeated looks. If the decoded video is a valid synchronous range reply pulse, the echo monitor range gate stays at that range and after 0.2 second, when the DME is in the 75 Hz. PRF (Pulse Repetition Frequency) mode, or 0.8 second, when the DME is in the 18.75 Hz. PRF mode of operation, the DME is trigger reset to search thereby initiating another search cycle.

10 Claims, 5 Drawing Figures

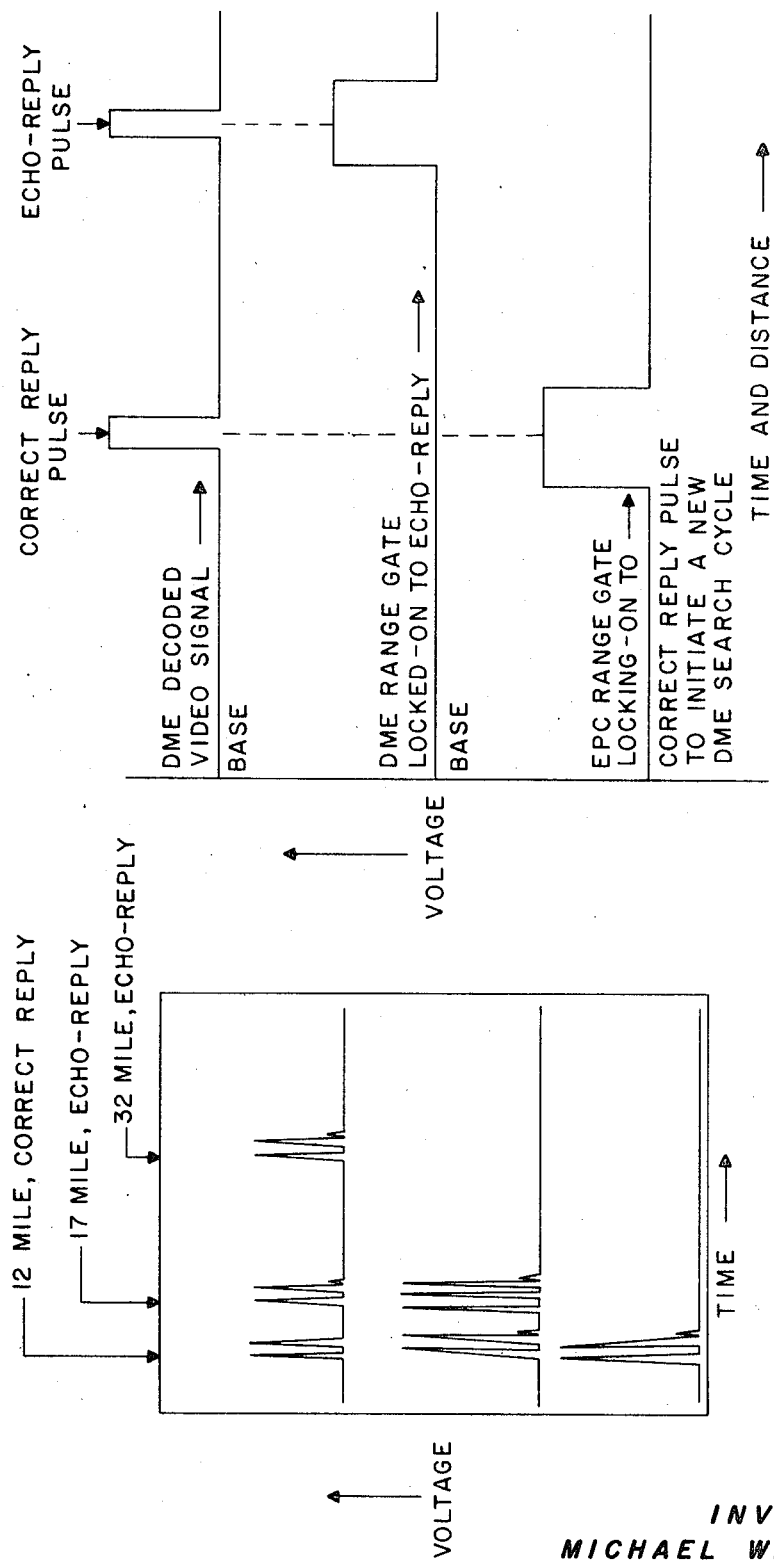

DIGITAL ECHO PROTECTION CIRCUIT FOR DME AND TACAN

This invention relates in general to aircraft radio distance measuring systems, and in particular, to a digital signal echo false distance indication sensing and correcting circuit.

With reference to aircraft distance measuring systems, be it DME or TACAN, or any other such distance measuring system, just as pointed out in U.S. Pat. No. 3,478,355 one coinventor of which is a coinventor hereof, and that is assigned to a common assignee, the slant range from the aircraft to any one particular ground station being selectively interrogated is determined by measuring the time delay between the moment of transmission of interrogation pulses by the airborne DME or TACAN radio system and the receiving of the interrogation response reply pulses transmitted by the ground station. A sometimes dangerous condition, or at least potentially dangerous condition, may come into existence if, for example, a DME or TACAN radio system searching in the outbound direction fails to lock on to the correct reply pulse and instead locks on to a reply initiated by an echo of the air-to-ground station signal transmission. Although such echo signals may be quite weak, the receivers of ground stations are very sensitive to quite a range of weak aircraft transmitted signals and the ground station dutifully reacts at times to weak echo signals and rebroadcasts a full strength return pulse signal. These echo delays come about since the signal path to an object and a resulting reflection from that object to the ground station being interrogated is much longer than the true direct distance from the aircraft transmitter to the ground station. Through experience, it has been found that such troublesome echo reply pulses when experienced generally fall in a delay range, as translated to increased distance, from approximately 5 miles to as much as 40 miles greater range than a correct reading provided with proper response to correct reply pulse signaling from the ground station being interrogated. Obviously, such echo reply erroneous signalling is dependent in great measure upon the particular terrain and signal reflecting objects within effective signal echo return proximity to the ground station concerned, and at times, may even contribute to more than one echo return signal pulse simultaneously being generated from the interrogation signals transmitted from the aircraft.

With newly developed digital DME and TACAN systems with higher speed searching than with slower searching analogue systems the chances of locking on to an echo reply are much greater than with the analogue systems. For example, with an operating analogue system lock on to a valid reply is achieved generally on the first search cycle while with an operating digital system the desired reply is missed approximately 50 percent of the time with 70 percent reply efficiency. Thus, it appears that there is a greater requirement for echo protection with digitalized DME than with the previous DME systems.

It is, therefore, a principal object of this invention to provide a fast acting echo false distance correction circuit for fast searching digitalized DME or TACAN systems.

Another object with such a digitalized echo protection circuit is to prevent DME echo reply lock on for more than a predetermined very short interval of time and to minimize false distance indication.

A further object with such a digitalized echo protection circuit is to provide such protection in a DME digitalized system with the protection provided through approximately the first one hundred miles of, for example, a 400-mile DME range.

Still another object is to provide such a digitalized DME system including echo protection that is compact, lightweight, relatively inexpensive, less complex, highly reliable and easily maintained.

Features of the invention useful in accomplishing the above objects include, in a digitalized echo protection circuit with a digitalized DME system, a protection circuit with a variable delay range gate that searches for a synchronous reply pulse. With this digitalized system, the echo protection circuit sweeps outward, that is in a increasing range direction, until there is a coincidence with a reply pulse within the first approximately 100 miles of the DME range and then the range gate is stopped, a lock on circuit is activated triggering the DME inbound, and thereupon initiates a new search cycle if generally, in fact, the DME range gate is locked on to an echo reply. During normal operation when the return is correct, the echo protection circuit range gate searches for a reply pulse from the equivalent of 0 miles out to the DME range gate where they come into coincidence through the first 100 miles of the DME range. Then the echo monitor counter is reset to zero, thereby resetting the echo protection circuit range gate again to the equivalent of 0 miles range in a continuously recycling action for the echo protection circuit so long as the DME is locked on the correct return. Please not that since the echo reply pulses are always further outbound than a correct ground station reply, the echo protection circuit range gate can lock on to the correct reply pulse only when the DME is locked on to an echo reply pulse.

A specific embodiment that is presently regarded as the best mode of carrying out the invention is illustrated in the accompanying drawings.

IN THE DRAWINGS

FIG. 1 represents three traces duplicating an oscilloscope presentation of the video amplifier signal with the top trace including the correct DME reply and two echo replies, the second trace including the correct reply and one echo reply and the third trace just solely the correct reply;

FIG. 2, is a graph of first, at the top, the DME decoded video signal, second the DME range gate locked on to the echo reply, and the echo protection range gate locked on to the correct reply pulse to initiate a new DME search cycle when it is not coincident with the DME range gate locked on echo reply;

Figure 3:
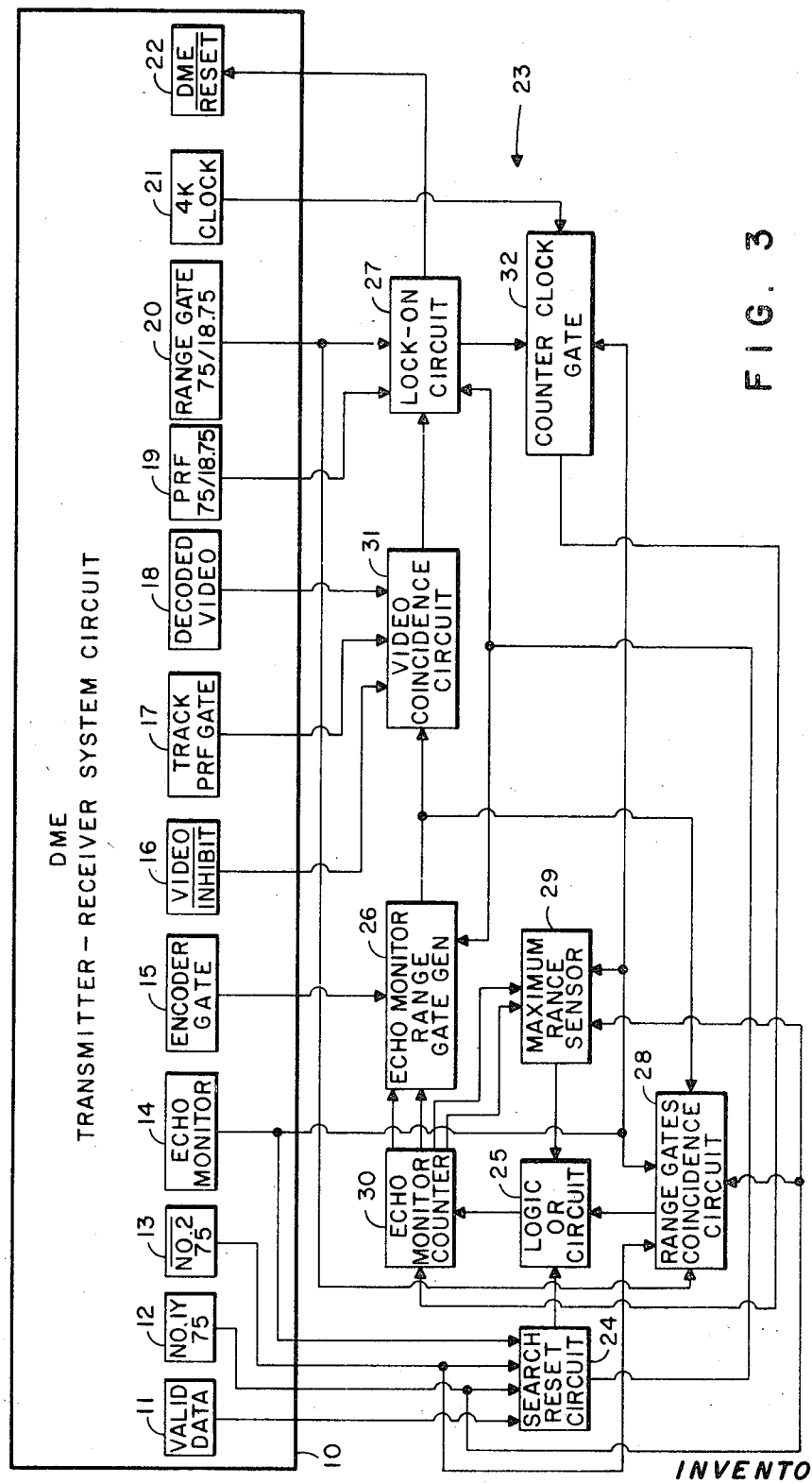
Figure 4:
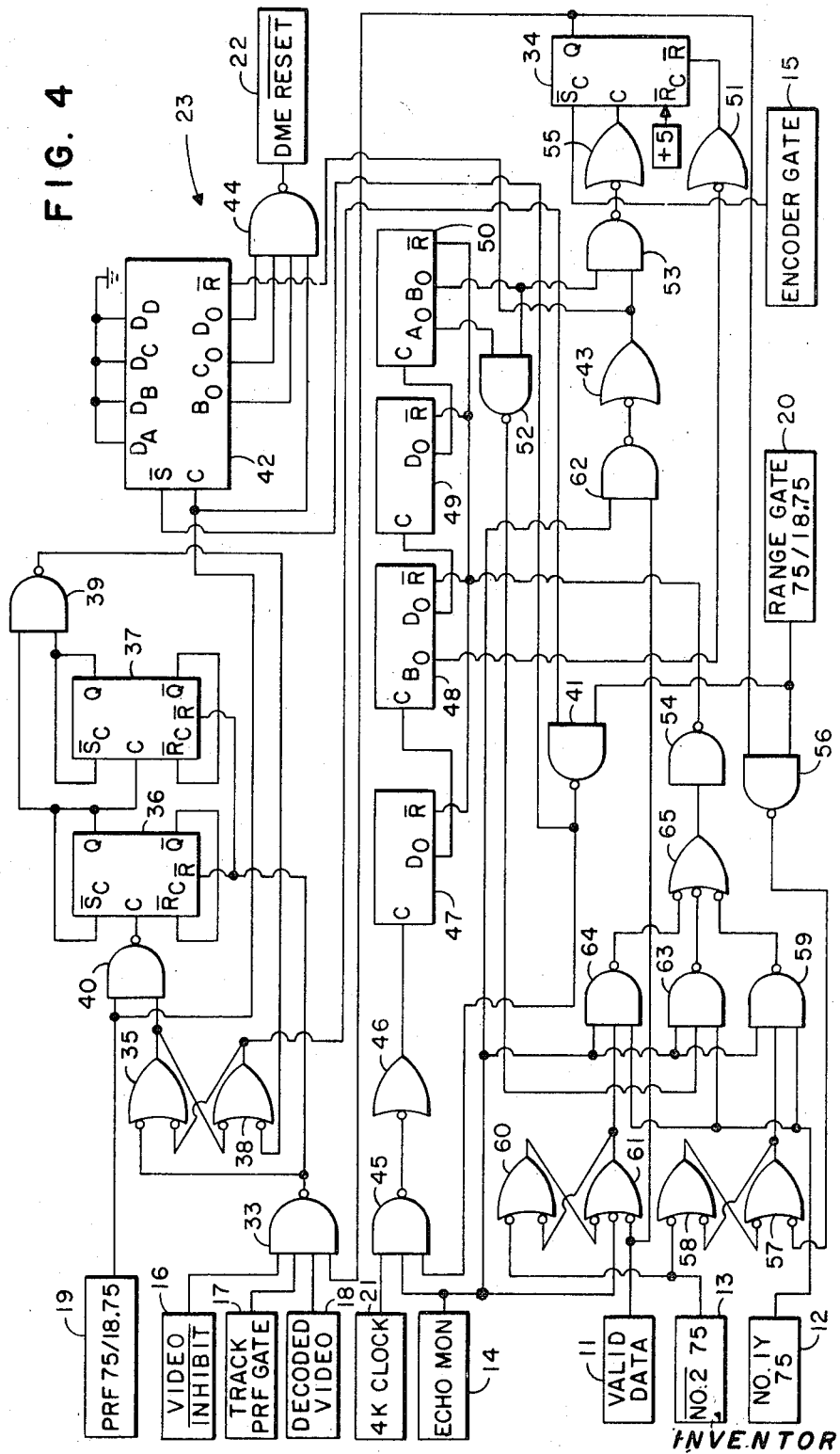
Figure 5:
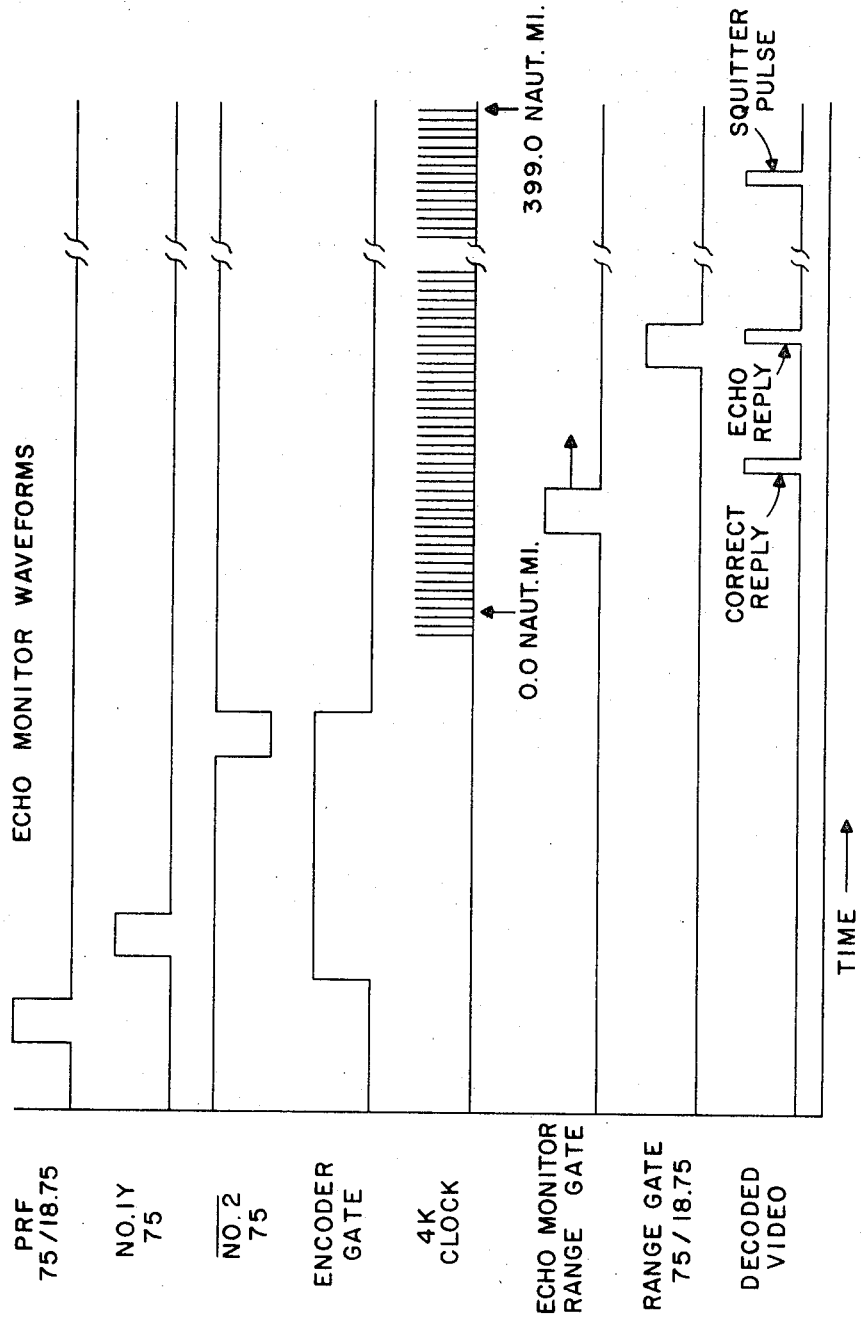

FIG. 3, a block diagram of the echo protection circuit as related to a digital DME transmitter-receiver system;

FIG. 4, a combination schematic block diagram of the digital echo protection circuit set forth in FIG. 3; and FIG. 5, a family of echo monitor waveforms more specifically applicable to the digital DME and echo protection circuit with the DME system locked on to an echo reply and the echo monitor range gate approaching the correct reply.

Referring to the drawings:

FIG. 1 illustrates a condition with the top trace a correct reply video signal at approximately 12 miles, an echo reply video signal at approximately 17 miles and an additional echo reply video signal at approximately 32 miles. The second trace has the correct video response at approximately 12 miles just as with the top trace, and also an echo reply video response indication at approximately 17 miles while the third and bottom trace indicates just solely a correct reply video pulse at approximately 12 miles. It would be fine if all video triggered response traces were as indicated in trace 3, however, the conditions of the first and second traces are encountered far too often and, as pointed out hereinbefore, this leads to, at times, a dangerous condition of false distance reading in DME or TACAN or other such distance measuring radio systems.

In the graph of FIG. 2 the waveforms shown are such as would be developed with some DME systems operable responsively to such signalling as that displayed in FIG. 1. The top waveform of FIG. 2 is of DME decoded video, the middle waveform of a DME range gate locked on as an echo reply, and the bottom waveform that of the echo protection range gate locked on the correct reply pulse to initiate a new DME search cycle when it is not coincident with the DME range gate.

With the digitalized DME transmitter-receiver system 10 of FIG. 3 such as the subject matter of copending U.S. Patent application Ser. No. 870,026 filed Oct. 28, 1969 entitled "All Digital Distance Measuring Equipment" inventor Dean P. Huntsinger, assigned to a common assignee; and that is consistent with schematics and other drawings along with extensive descriptive writing shown and well known to many of those skilled in the art of, for example, Collins Radio Company's 860E-3 DME equipment, commercially available on the market, as set forth and referred to in the Overhaul Manual therefore carrying the identification number 523-0761155-001112 (dated June 1, 1969) a number of function connective points are set forth by legend boxes. These include, valid data 11, No. 1Y 75 connection 12, $\overline{\text{No. 2}}$ 75 connection 13, echo monitor 14, encoder gate 15, video $\overline{\text{inhibit}}$ 16, track PRF gate 17, decoded video 18, PRF 75/18.75 connection 19, range gate 75/18.75 connection 20, 4 K clock 21, and DME reset 22. The valid data 11 connection point is digital logicwise a "1" when the DME is locked on and tracking a signal. The No. 1Y 75 connection point 12 provides a 75 Hz. PRF (Pulse Repetition Frequency) that is a positive going pulse train synchronous with the PRF 75/18.75 pulse train and the $\overline{\text{No. 2}}$ 75 signal but spaced between them. The $\overline{\text{No. 2}}$ 75 connection point 13 carries a negative going 75 Hz. PRF pulse train in synchronous with the PRF 75/18.75 pulse waveform train but delayed several microseconds with respect thereto. The echo monitor signal point 14 develops a digital logic "1" during the echo monitor mode of operation. A pulse appearing at encoder gate 15 brackets the No. 1Y 75 and $\overline{\text{No. 2}}$ 75 signals and acts as an encoder gate to disable the echo monitor range gate generator 26 when the counter circuit 30 of echo protection circuit 23 is being reset. At the video $\overline{\text{inhibit}}$ 16 connection a digital logic signal "1" is developed extending from the PRF 75/18.75 pulse signal train to the leading edge of the DME range gate. This is used to prevent the echo monitor from locking on to a synchronous echo reply outbound from the range gate. The signal appearing at the track PRF gate 17 connection is a logic signal "1" during search but during track it converts to a 25 percent duty cycle waveform effectively reducing the echo monitor range gate repetition frequency from 75 Hz. to 18.75 Hz. The decoded video 18 connection point presents the received signal from the ground station after it has been decoded from properly spaced pairs of pulses. The PRF 75/18.75 signal connection point provides a pulse initiating the DME transmitter and the 4 K clock with a pulse repetition frequency of 75 Hz. in search and 18.75 Hz. in track modes of operation. The range gate 75/18.75 connection point 20 carries the DME range gate signal having a 75 Hz. PRF during the search mode and during track mode a 18.75 Hz. PRF. The 4 K clock connection point 21 presents 4,000 clock pulse bursts at a frequency rate of 809.126 kHz. with individual respective 4 K clock pulse bursts being initiated by, although delayed from the PRF 75/18.75 pulse waveform. The DME $\overline{\text{reset}}$ connection point 22 is reactive to a digital logic "0" applied from the echo monitor or echo protection circuit 23 to thereby responsively trigger the DME system into the search mode.

The valid data 11, No. 1Y 75 connection 12, $\overline{\text{No. 2}}$ 75 connection 13, and echo monitor 14 signal sources provide signal inputs to search reset circuit 24 that has an output connection to logic OR-circuit 25 and an output connection to both echo monitor range gate generator 26 and lock-on circuit 27. The No. 1Y 75 signal connection 12 of the DME system 10 is also connected to the range gates coincidence circuit 28 and to the maximum range sensor circuit 29. The $\overline{\text{No. 2}}$ 75 connection point 13 and the echo monitor 14 signal point are also connected to the range gates coincidence circuit 28 that also receives as an input the range gate 75/18.75 signal. The range gates coincidence circuit 28 is also connected to receive a signal output from echo monitor range gate generator circuit 26 and has an output connection to logic OR-circuit 25 also provided with an input connection from maximum range sensor circuit 29 and an output connection to echo monitor counter circuit 30. This echo monitor circuit 30 has two output connections to echo monitor range gate generator 26, and also two output connections to maximum range sensor circuit 29. The echo monitor range gate generator 26 has an output connection as an input to video coincidence circuit 31 that also has input connections from video $\overline{\text{inhibit}}$ 16, track PRF gate 17, and decoded video 18 signal points of the DME system 10. The output of video coincidence circuit 31 is connected as an input to lock-on circuit 27 along with the PRF 75/18.75 and range gate 75/18.75 DME signal points 19 and 20 to develop an output to counter clock gate circuit 32. Circuit 32 also includes input connections from the 4 K clock 21 and echo monitor 14 signal connection points of the DME and develops an output connected back as an input to echo monitor counter circuit 30. The lock-on circuit 27 also has an output signal connection to DME $\overline{\text{reset}}$ 22 for echo protection circuit reset cycling control of the DME system.

Referring also to the more detailed block schematic diagram of FIG. 4 the NAND-gate 33 with its circuit input connections from video $\overline{\text{inhibit}}$ 16, track PRF gate 17, decoded video 18, and the Q output of clock SR flip-flop counter circuit 34, acting as the video coincidence circuit 31 FIG. 3 develops a negative going output pulse signal applied as an input to NAND identity gate 35, and as inputs to the R input terminals of both counter clock SR flip-flop circuits 36 and 37. NAND identity gate 35 is part of a tieback flip-flop circuit along with NAND identity gate 38 with the outputs of the two NAND identity gates 35 and 38 tied back to second inputs, respectively, of the opposite NAND identity gates 35 and 38. The other input of NAND identity gate 38 is from the negative going pulse output of NAND gate 39. The output of NAND identity gate 35 is connected as an input to NAND-gate 40 that also has an input connection from PRF 75/18.75 connection point 19, and the NAND-gate 40 has a negative going pulse signal output terminal connected to the C terminal input of clock SR flip-flop circuit 36. The $\overline{Q}$ output of each of the clock SR flip-flop circuits 36 and 37 are, respectively, connected back to the $\overline{R}_c$ inputs thereof. The Q output of clock SR flip-flop circuit 36 is connected back as the $\overline{S}_c$ input thereto as the C input of clock SR flip-flop circuit 37, and also as an input to NAND-gate 39. The Q output terminal of clock SR flip-flop circuit 37 is connected both back as an input to the $\overline{S}_c$ terminal thereof and also as an input connection to NAND-gate 39. Referring back to NAND identity gate 38 the output thereof is connected as an input to NAND-gate 41 that receives an additional input from range gate 75/18.75 connection point 20. The NAND-gate 41 negative going pulse output terminal is connected to the $\overline{S}$ input of four-bit binary counter 42 having a C input terminal connection from the PRF 75/18.75 connection point 19. The $\overline{R}$ reset terminal of the four-bit binary counter circuit 42 is connected to the output of NAND identity gate 43 while the $D_a$, $D_b$, $D_c$ and $D_d$ terminals of four-bit binary counter circuit 42 are connected to ground. The $B_o$, $C_o$ and $D_o$ terminals of four-bit binary counter 42 are connected as input connections to NAND-gate 44 that also has an input connection from PRF 75/18.75 connection point 19, and the NAND-gate 44 negative going pulse signal output terminal is connected to DME $\overline{\text{reset}}$ connection point 22. The negative going pulse output terminal of NAND-gate 41 is also connected as an input to NAND-gate 45 having additional input connections from the echo monitor connection 14 and the 4 K clock 21. The negative going pulse output terminal of NAND-gate 45 is connected as an input to NAND identity gate 46 having an output connection to the C terminal of four-bit decade counter circuit 47 having a $D_o$ output connected as the C terminal input connection of four-bit decade counter circuit 48 in turn having a $D_o$ output connection to the C input terminal of four-bit decade counter 49. The $D_o$ output terminal of four-bit decade counter 49 is connected to the C input terminal of four-bit binary counter circuit 50. The $B_o$ output terminal of four-bit decade counter 48 is connected as an input to NAND identity gate 51 with an output connection to the $\overline{R}$ input terminal of clock SR flip-flop counter circuit 34. The $A_o$ output of four-bit binary counter 50 is connected as an input to NAND-gate 52 and the $B_o$ output is connected both as an input to NAND-gate 52 and also as an input to NAND-gate 53. The $\overline{R}$ reset signal input of four-bit decade counters 47, 48, and 49 and the $\overline{R}$ reset input terminal of four-bit binary counter 50 are all connected in common for receiving negative going pulse signals from the output terminal of NAND-gate 54.

The negative going pulse signal output terminal of NAND-gate 53 is connected to the input terminal of NAND identity gate 55 with an output terminal connected as a C terminal input of clock SR flip-flop counter circuit 34 with a $\overline{S}$ input terminal connected for receiving an encoder gate signal from encoder gate 15. The Q output of clock SR flip-flop counter circuit 34, in addition to being connected as an input to NAND-gate 33, is connected also as an input to NAND-gate 56 that also, along with NAND-gate 41, has an input connection from the range gate 75/18.75 connection point 20. The negative going pulse signal output terminal of NAND-gate 56 is connected as an input to NAND identity gate 57. NAND identity gate 57 is part of a tieback flip-flop circuit along with NAND identity gate 58 with NAND identity gate output terminals tied back to second inputs, respectively, of the opposite NAND identity gates 57 and 58. The other input terminal of NAND identity gate 58 is connected to the $\overline{\text{No. 2}}$ 75 connection point 13 and the output of the tieback flip-flop circuit that is also the output terminal of NAND identity gate 57 is connected as an input to NAND-gate 59. The $\overline{\text{No. 2}}$ 75 connection point 13, in addition to being connected to an input terminal of NAND identity gate 58 is also connected as an input to NAND identity gate 60 of a third additional tieback flip-flop circuit with a NAND identity gate 61 that is a three input NAND identity gate. With this tieback flip-flop circuit just as with the others the outputs of the NAND identity gates 60 and 61 are tied back as inputs respectively, to the opposite NAND identity gates 60 and 61. The valid data connection point 11 is connected as an input to NAND identity gate 61 and also as an input to the NAND-gate 62. Echo monitor 14 is connected as a third input to NAND identity gate 61 as well as NAND-gate 45 and also to NAND-gate 62. NAND-gate 45 also receive inputs from 4 K clock connection point 21 and from the output of NAND-gate 41. The echo monitor connection point 14 is also connected to input connections of NAND-gates 59, 63, and 64. The output of the third additional tieback flip-flop circuit that is also the output of NAND identity gate 61 is connected as an input to NAND-gate 64. The output of NAND-gate 52 is connected as an input to NAND-gate 63 and the No. 1Y 75 connection point 12 is connected as an input to the three NAND-gates 59, 63, and 64. The output terminals of the three NAND-gates 59, 63 and 64 are connected as the three inputs of three input terminal NAND identity gate 65 with an output connection to NAND-gate 54.

When the DME locks on to a ground station, the interrogation repetition rate is held at the high rate of 75 Hz. for about 2.8 seconds in a working embodiment thereof. During this time the echo monitor circuit 23 can search from 0 to about a 100 mile range. This prevents the DME from being locked on to an echo, such as is portrayed with waveforms of FIG. 5, for more than 2.8 seconds. Please note, in a working embodiment of the DME system 10 and the echo protection circuit 23, that while the DME is operable trackwise out to as much as practically 400 nautical miles it is consistent with one-tenth of a nautical mile pulse period spacing in the 4 K clock. Further, the echo protection circuit is designed to track out to a limit of 100 nautical miles since as a practical matter the echo signal strength to a ground station with greater than 100 nautical miles spacing is signalwise so many db. down in the noise of the system as to not be detectable generally by ground stations. This obviously negates the requirement for echo protection other than in the first 100-mile radius of most any ground station being interrogated. In the working embodiment after the DME has been locked on for 2.8 seconds, the interrogation rate is changed from 75 to 18.75 Hz. Please note, that in this working embodiment of the echo protection circuit 23 and that DME system 10 that the counters 47, 48, 49 and 50 as a section are shared with another circuit on a 50 percent duty cycle with the echo monitor operating for 30 seconds of each minute. In any event the echo monitor operates with a search speed of approximately 8 miles per second.

When the echo monitor or echo protection circuit 23 is functioning, bursts of 4,000 (4 K clock) occurring at 13.3 millisecond intervals are gated from the 4 K clock 21 through NAND-circuit 45 and NAND identity gate 46 to the input of the modulo 4,000 counter 30 that includes the four-bit decade counters 47, 48, and 49 and the four-bit binary counter 50. The 4,000 pulses in each burst have a frequency of 809.126 kHz. with the pulse period being equal to the rate or round trip time for 0.1 nautical mile range. The spacing of 13.3 milliseconds between bursts is determined by the basic 75 Hz. rate that the DME uses in computing range. With counters 47, 48, and 49 forward decade counters and counter 50 a forward binary counter each time the 4 K clock is gated into the counter 47 the $B_0$ output of four-bit binary counter 50 rises to a logic "1" and falls to a logic "0" only once. When the output appearing at the $B_0$ terminal of counter 50 falls this negative going transition is gated through NAND-gate 53 when the DME distance data is valid and the DME is in the echo monitor mode of operation. The resulting negative transition appearing at the C input terminal of clock SR flip-flop 34 toggles the output thereof appearing at the output terminal Q to a logic "1." Twenty 4 K clock pulses later the $B_0$ output of counter 48 goes to a logic "1" and resets flip-flop 34 through inverter gate 51. Thus, the echo monitor range gate is initiated when the counters 47, 48, 49 and 50 go from 399.9 to 000.0 and terminated when they count up to from 001.9 to 002.0 with the count from 000.0 to 002.0 equaling 2 nautical miles. The shifting location of the echo monitor range gate with respect to individual bursts of 4 K clock is determined by the number initially in the echo monitor counter 30 (including counters 47, 48, 49, and 50). The number 399.2 corresponds to minimum range and 300.0 corresponds to the 100 mile echo protection effective range. The range gate is moved out by deleting eight clock pulses from the 4 K clock burst to cause the counter 30 (i.e., counters 47, 48, 49 and 50) to end up at a smaller number corresponding to an 0.8 nautical mile increase in range.

When the echo monitor gate intercepts a decoded video pulse in NAND-gate 33 the tieback flip-flop with NAND identity gates 35 and 38 is set to logic "1." The resulting output therefrom enables NAND-gate 40 for feed of PRF 75/18.75 signalling to the C input of counter 36 thereby activating the counters 36 and 37. When three PRF pulses have been counted the output of NAND-gate 39 goes to ground and resets the tieback flip-flop circuit of NAND identity gates 35 and 38. While the NAND identity gate 35 and 38 tieback flip-flop circuit was set the output therefrom appearing at the output of NAND identity gate 38 was a logic "0" that inhibits NAND-gate 41 from passing range gate 75/18.75 signalling. Under these conditions the range gate 75/18.75 signal is prevented from deleting eight pulses of the 4 K clock at NAND-gate 45. This keeps the echo monitor range gate stationary for three interrogation periods each time it intercepts, that is, in coincidence with a decoded video pulse. Had the decoded video pulse been a synchronous reply pulse then four-bit binary counter 42 would have counted 13 pulses (of the PRF 75/18.75) and reset the DME to search via NAND-gate 44. Please note, that NAND-gate 41 does not strobe counter 42 logic "0" with the range gate 75/18.75 when the tieback flip-flop of NAND identity gate 35 and 38 is set.

When the maximum range approximating 100 miles with the echo monitor system is reached, the output of NAND-gate 52 becomes a logic "1" thereby enabling the No. 1Y 75 to reset the echo monitor counter 30 (i.e., counters 47, 48, 49, and 50) to 000.0 through NAND-gate 63, NAND identity gate 65 and NAND-gate 54. Please note, that the four-bit binary counter 42 is held reset by the output of NAND identity gate 43 when the DME is not displaying valid data while in the echo monitor mode of operation. The tieback flip-flop of NAND identity gates 60 and 61 assures that the echo monitor counter 30 with counters, 47, 48, 49 and 50 will start from 000.0 when the echo monitor mode is initiated. Further, the tieback flip-flop of NAND identity gate 57 and 58 resets the echo monitor counter 30 with counters 47, 48, 49 and 50 to the 000.0 state when the echo monitor range gate becomes coincident with the range gate 75/18.75 signal in NAND-gate 56.

For a more thorough understanding of the DME operation and echo protection circuit operational features advantageously provided therefor please consider the following, including some reiteration, to further understanding of the operation features presented. When the DME goes into the track mode, the echo protection circuit takes over control of the search forward counter. Since this counter has a modulo at exactly 4 K the insertion of 4,000 clock pulses will result in no change in the state of the counter. If, however, a number of clock pulses somewhat less than the full modulo of the counter is inserted, the counter will end up with a number which is smaller than the original number by the amount of clock pulses less than the modulo that was inserted (e.g., a modulo 10 counter has the number 9 in it eight pulses or two less than the modulo are inserted). The final state of the counter is a seven. Now, if we take a reference point at a particular state of the counter (say all zeros) and begin with the counter at this reference at some particular time, $T_o$, and insert a number of clock pulses less than the modulo, the counter will be at some number below the reference at the end of the cycle. At the next $T_o$ time we again run the same number of clock pulses as before and look for the reference point to appear in the counter. This occurs sometime $T_1$ after the reference time $T_o$ since the counter was initially at a point below our reference. Sine we have again run the counter short of its full modulo its l state will be twice as far below our reference as the previous time and consequently will take twice as long to appear after the next reference $T_o$ (e.g., the state 0001 is selected in a modulo 10 counter as a reference). Beginning with a counter in this state we insert 9 one second clock pulses and our reference appears at $T_o$ this time. The counter at the end of the cycle will be in the state 0000. Again beginning at $T_o$ nine pulses are inserted and the reference is looked for. This time the 0001 state appears at $T_o$ plus 1 second with the counter now in the state 1001. With the cycle again repeated adding 9 more pulses at $T_o$ the reference occurs then at $T_o$ plus 2 seconds. Using the counter in this manner it is possible to increase the steps in the time delay from $T_o$ to the reference. If at any time it is desired to hold the time delay constant all that is necessary is to run the full modulo into the counter to thereby make the reference occur at the same time after $T_o$.

In the case of the echo protection circuit 23, the reference point is the range gate and the counter is the search forward counter (modulo 4K). The reference point is actually decoded directly off the search counter and at present represents 1.8 miles in time. Since the search counter is preset to a number below 0, the echo protection circuit searches outbound from a number slightly below the actual 0 nautical mile (0NM) point.

The range gate generated in this manner gradually moves outbound "looking" for a video reply. On the first coincidence of a video and the range gate, the full modulo is allowed to run into the counter, thus holding the range gate stationary.

A system of counters is programmed to establish two criteria before triggering the DME into search. The main criterion is 10 hits in the range gate out of 16 interrogations. A secondary criterion is that no two misses can occur consecutively. Once the 10 out of 16 requirement is met a signal from the echo protection circuit triggers the DME into the search mode.

Whereas this invention is here illustrated and described with respect to several specific embodiments thereof, it should be realized that various changes may be made without departing from the essential contributions to the art made by the teachings hereof.

We claim:
1. A digitalized echo false distance indication sensing and correcting circuit for an aircraft radio transmitter-receiver distance measuring system using digital signal counting circuitry and having, a decoded video connection, a distance measuring system range gate connection, a predetermined clock count number modulo connection, and an inbound slew control reset connection; and having: echo protection counting circuit means with a predetermined total count having output signal means undergoing a change of state cycle with each predetermined total count through said echo protection counting circuit means; echo protection circuit range gate generating means connected to said echo protection counting circuit means; video coincidence circuit means connected to said decoded video connection and to said echo protection circuit range gate generating means; lock-on circuit means connected to said range gate connection and to said video coincidence circuit means including multiple look sampling means to determine if decoded video pulses are synchronous with the range gate of said echo protection circuit range gate generating means; and echo protection circuit range gate recycling means to allow the range gate to return to 0 miles to begin a new search cycle.

2. The digitalized echo false distance indication sensing and correcting circuit of claim 1, wherein video inhibit means is circuit connected to feed an input to said video coincidence circuit means.

3. The digitalized echo false distance indication sensing and correcting circuit of claim 1, wherein the aircraft radio transmitter-receiver distance measuring system has a PRF (pulse repetition frequency) circuit functioning at a fast rate during the search mode and functioning at a reduced fractional rate duty cycle during the track mode and having PRF gate circuit means connected to said video coincidence circuit means for gating the PRF search to track mode rate to the video coincidence circuit means and the echo false distance indication sensing and correcting circuit.

4. The digitalized echo false distance indication sensing and correcting circuit of claim 3, wherein said multiple look sampling means includes a four-bit binary counter in said lock-on circuit means having a plurality of output connections to a DME reset gate circuit; and with the lock-on circuit and DME reset gate circuit also connected to said PRF circuit.

5. The digitalized echo false distance indication sensing and correcting circuit of claim 4, wherein said lock-on circuit means includes two counter clock flip-flop circuits connected for receiving inputs from said PRF circuit, a video inhibit circuit, a track PRF gate, decoded video connection means, and said echo protection circuit range gate generating means for developing an output to a counter clock gate in circuit means to said echo protection counting circuit means.

6. The digitalized echo false distance indication sensing and correcting circuit of claim 5, wherein said transmitter-receiver distance measuring system also includes an encoder gate connection, an echo monitor connection, and a valid data connection, and with; said encoder gate connection feeding to said echo protection circuit range gate generating means; said echo monitor connection is connected to a range gate coincidence circuit means and to a maximum range sensor circuit connected for having inputs from an echo monitor counter circuit and an output to said logic or circuit; and with said valid data connection feeding a search reset circuit also connected to said echo monitor and to said logic or circuit.

7. The digitalized echo false distance indication sensing and correcting circuit of claim 1 wherein said aircraft radio transmitter-receiver distance measuring system is operable through a predetermined range of searching and tracking from a tune selected ground station; and said echo protection counting circuit means and said echo protection circuit range gate recycling means control the echo protection circuit for protective operation through a predetermined range less than the operational predetermined range of searching and tracking of the distance measuring system.

8. The digitalized echo false distance indication sensing and correcting circuit of claim 7, wherein said predetermined range of operation of said echo protection circuit is from the tune selected ground station out through said predetermined range of operation.

9. The digitalized echo false distance indication sensing and correcting circuit of claim 1, wherein said echo protection circuit range gate generating means is connected to said decoded video connection through said video coincident circuit means as an input to said lock-on circuit.

10. The digitalized echo false distance indication sensing and correcting circuit of claim 9 wherein said echo protection counting circuit means includes, three serially connected four-bit decade counter circuits and a serially connected four-bit binary counter circuit; with the three four-bit decade counter circuits and the four-bit binary counter circuit having common connected reset terminals connected to gated reset activating circuit means.

* * * * *